United States Patent [19]
Hamabe

[11] Patent Number: 5,475,864
[45] Date of Patent: Dec. 12, 1995

[54] HIGH-CROSS CORRELATION DYNAMIC CHANNEL ASSIGNMENT FOR SECTORIZED CELLS

[75] Inventor: Kojiro Hamabe, Tokyo, Japan

[73] Assignee: NEC Corporation, Japan

[21] Appl. No.: 277,333

[22] Filed: Jul. 19, 1994

[30] Foreign Application Priority Data

Jul. 19, 1993 [JP] Japan ................................ 5-177130

[51] Int. Cl.$^6$ ................................................ H04M 11/00
[52] U.S. Cl. ........................ 455/33.1; 455/56.1; 455/62; 455/63; 379/59
[58] Field of Search ................................ 455/33.1, 33.3, 455/34.1, 56.1, 62, 63; 379/59

[56] References Cited

U.S. PATENT DOCUMENTS

| | | | |
|---|---|---|---|
| 4,794,635 | 12/1988 | Hess . | |
| 5,038,399 | 8/1991 | Bruckert | 455/62 |
| 5,276,907 | 1/1994 | Median | 455/33.3 |
| 5,280,630 | 1/1994 | Wang | 455/62 |
| 5,355,514 | 10/1994 | Borg | 455/56.1 |
| 5,396,649 | 3/1995 | Hamabe | 455/62 |
| 5,408,684 | 4/1995 | Yunoki et al. | 455/62 |

FOREIGN PATENT DOCUMENTS

| | | |
|---|---|---|
| 430173 | 6/1991 | European Pat. Off. . |
| 458158 | 11/1991 | European Pat. Off. . |
| 522276 | 1/1993 | European Pat. Off. . |

OTHER PUBLICATIONS

*1992 IEEE Internation Conference on Selected Topics in Wireless Communications,* Conference Proceedings, Jun. 25–26, 1992, "Performance of Dynamic Channel Assignment Techniques in a Cellular Environment", by Iain Brodie, pp. 340–343.

Y. Furuya, et al., "*Channel Segregation, A Distributed Adaptive Channel Allocation Scheme for Mobile Communication Systems*", Second Nordic Seminar on Digital Land Mobile Radio Communication, Stockholm, 1986, pp. 311–315.

H. Andersson, et al., "*Adaptive Channel Allocation in a TIA IS-54 System*", Vehicular Technology Conference, 1992, pp. 778–781.

*Primary Examiner*—Edward F. Urban
*Assistant Examiner*—Andrew Faile
*Attorney, Agent, or Firm*—Ostrolenk, Faber, Gerb & Soffen

[57] ABSTRACT

In a cellular communication system, an array of sector antennas is provided at each cell site for respectively covering sectors of the service area of the cell site. At each cell site, undesired signals of different channels are received by each antenna, and their magnitudes are determined. One of the signals is selected from each set of signals from the antennas depending on their magnitudes to produce channel signals respectively for the different channels. A list of candidate channels is determined corresponding to those of the channel signals whose qualities are higher than a threshold. One of the candidate channels is selected from the list depending on the magnitudes of those channel signals whose qualities are higher than the threshold. The selected candidate channel is assigned to a mobile station if the selected channel has acceptable quality. Otherwise, it is discarded from the list and the attempt is repeated to select a further candidate channel.

9 Claims, 7 Drawing Sheets

CHANNEL ALLOCATION

SECTOR A = CHANNEL GROUP 1 (CH11, CH12, CH13,....)
SECTOR B = CHANNEL GROUP 2 (CH21, CH22, CH23, ...)
SECTOR C = CHANNEL GROUP 3 (CH31, CH32, CH33, ...)
SECTOR D = CHANNEL GROUP 4 (CH41, CH42, CH43, ...)

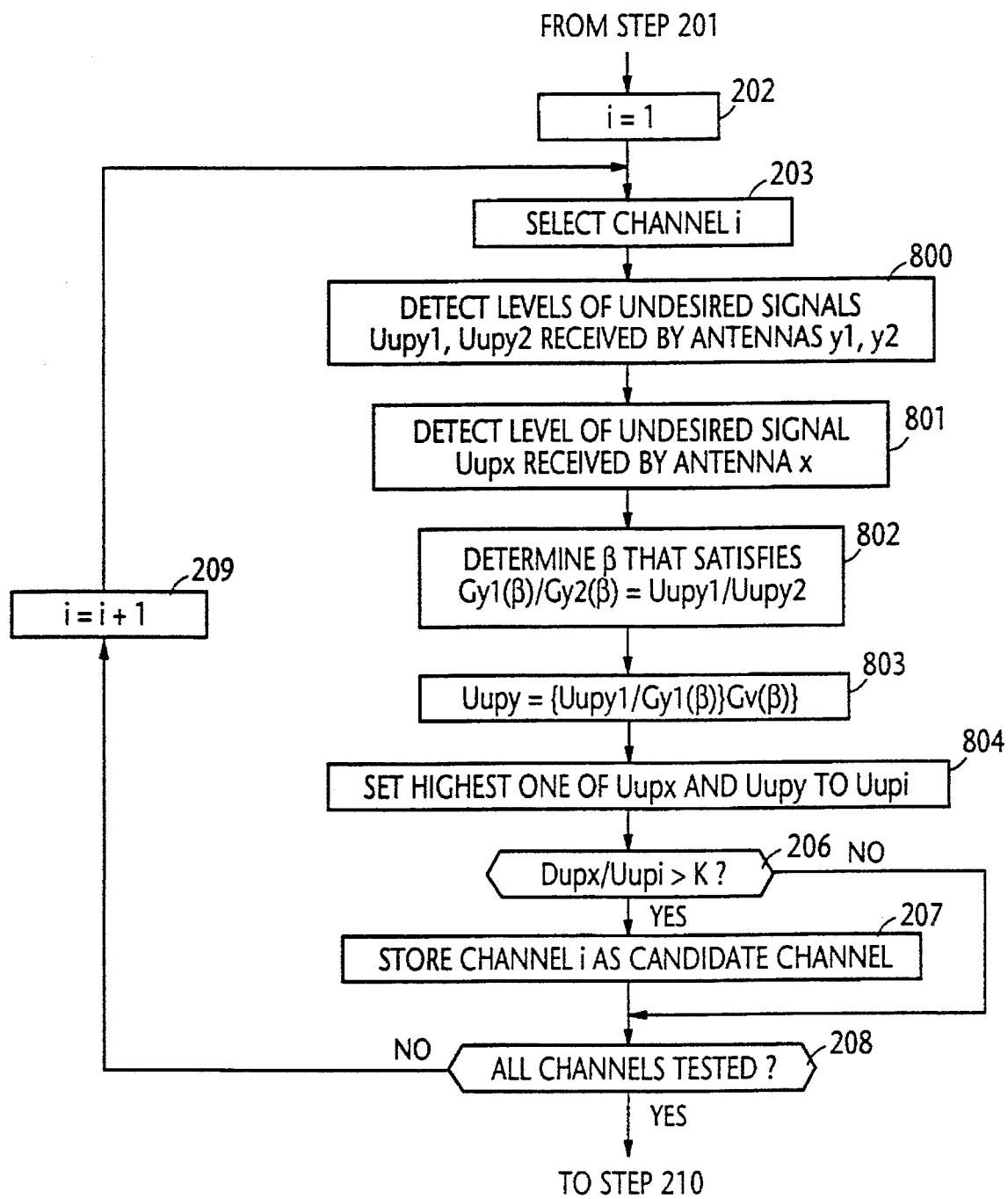

HIGH-CROSS CORRELATION DYNAMIC CHANNEL ASSIGNMENT FOR SECTORIZED CELLS

BACKGROUND OF THE INVENTION

1. Field of the Invention

The present invention relates generally to cellular communication systems, and more specifically to dynamic assignment of channels to mobile stations from a base station using an array of antennas respectively covering sectors of the service area of the base station.

2. Description of the Related Art

The capacity of a cellular mobile communication system may be increased by reducing the size of the cells so that the total number of channels available per unit area is increased. This is achieved in practice by the process of "cell splitting" where a new base stations are established. As the cells are split into smaller sizes, the co-channel interference from distant cells increases. One way of reducing the level of co-channel interference is to use directional antennas at base stations, with each antenna illuminating or covering a sector of the cell, whereas ominidirectional antennas used in non-sectorized cells.

Dynamic channel assignment schemes are known for efficient utilization of channels, and used for systems of non-sectorized cells. For sectorized cells, a dynamic channel assignment scheme is described in a paper "Channel Segregation, A Distributed Adaptive Channel Allocation Scheme for Mobile Communication Systems", Y. Furuya et al., Second Nordic Seminar on Digital Land Mobile Radio Communication, Stockholm, 1986, pages 311–315. According to the proposed scheme priorities are assigned to a list of available channels according to past records of co-channel interference. On receiving a request from a mobile station, a channel is selected from the list according to the priorities so that the mobile station has a reduced chance of encountering co-channel interference. A dynamic channel assignment scheme for efficient utilization of channels in sectorized cells is described in a paper "Adaptive Channel Allocation in a TIA IS-54 System", H. Andersson et al., Vehicular Technology Conference, 1992, pages 778 to 781. According to this scheme, carrier-to-interference ratio is used criteria for assigning priorities to available channels.

However, there is Still a need for improvements in dynamic channel assignment scheme for sectorized cells in terms of the utilization of channels, the number of channel selection attempts for each request, and the probability of co-channel interference. More specifically, assume that, in a sectorized cellular communication network, first and second mobile stations are respectively communicating with first and second base stations. The signal from the first base station may be received by the distant, second mobile station as an undesired downlink signal and produce a significant level of interference, while the signal from the first mobile station may be received by the second base station as an undesired uplink signal. If the directional antenna of the second base station which is being used for the second mobile station is oriented in a direction away from the first base station, the undesired uplink signal from the first mobile station will produce a low level of interference. Since interference is currently detected only from a signal received by the antenna used for a mobile station of interest, the cross correlation for co-channel interference between the uplink and downlink signals of the mobile station is low.

Because of the low cross correlation, the current dynamic channel assignment schemes are not satisfactory in respect of the utilization of channels, the number of channel selection attempts for each request, and the probability of co-channel interference.

SUMMARY OF THE INVENTION

It is therefore an object of the present invention to provide dynamic assignment which ensures high degree of cross correlation for co-channel interference between uplink and downlink signals.

According to a first aspect, the present invention provides a method for dynamically assigning a channel to a mobile station from a cell-site base station of a cellular communication system wherein each base station is provided with a plurality of antennas respectively covering sectors of the service area of the base station. The method comprises the steps of:

a) receiving a plurality of undesired signals of different channels by each antenna of a base station to produce a plurality of sets of antenna signals respectively corresponding to the antennas, and determining the magnitudes of the antenna signals of each set, the sets corresponding respectively to the different channels;

b) selecting one of the antenna signals from each set depending on their magnitudes to produce a plurality of channel signals respectively for the different channels;

c) evaluating qualities of the channel signals, and determining list of candidate channels corresponding to those of the channel signals whose qualities are higher than a predetermined threshold;

d) selecting one of the candidate channels from the list depending on the magnitudes of those of the channel signals whose qualities are higher than the predetermined threshold;

e) determining whether the selected candidate channel has acceptable quality or not;

f) assigning the selected candidate channel to the mobile station if the selected candidate channel is determined as having acceptable quality; and g) discarding the selected candidate channel from the list and repeating the steps (d) to (f) if the selected candidate channel is determined as not having acceptable quality.

According to a second aspect, the present invention provides a method for dynamically assigning a channel to a mobile station from a cell-site base station of a cellular communication system wherein each base station is provided with a plurality of antennas respectively covering sectors of the service area of the base station. The method comprises the steps of:

a) receiving a plurality of undesired signals of different channels by the antennas of the the base station to produce a plurality of sets of antenna signals respectively corresponding to the antennas, and determining the magnitudes of the antenna signals of each set, the sets corresponding respectively to the different channels;

b) selecting a highest magnitude antenna signal from each set and identifying a first one of the antennas by which the highest magnitude antenna signal is received;

c) selecting a second highest magnitude antenna signal from each set and identifying a second one of the antennas by which the second highest magnitude antenna signal is received, the second one of the antennas having a directivity pattern located adjacent a directivity pattern of the first one of the antennas;

d) determining the angle of arrival of a signal from the directivity patterns of the first and second ones of the antennas and the magnitudes of the highest magnitude antenna signal and the second highest magnitude antenna signal, and correcting the magnitude of the highest magnitude antenna signal by the directivity pattern of one of the first and second antennas as a function of the determined angle to produce a channel signal for each set;

e) evaluating qualities of the channel signals of the sets, and determining a list of candidate channels corresponding to those of the channel signals whose qualities are higher than a predetermined threshold;

f) selecting one of the candidate channels from the list depending on the magnitudes of those of the channel signals whose qualities are higher than the predetermined threshold;

g) determining whether the selected candidate channel has acceptable quality or not;

h) assigning the selected candidate channel to the mobile station if the selected candidate channel is determined as having acceptable quality; and i) discarding the selected candidate channel from the list and repeating the steps (f) to (h) if the selected candidate channel is determined as not having acceptable quality.

According to a third aspect, the present invention provides a method for dynamically assigning a channel to a mobile station from a cell-like base station of a cellular communication system wherein each base station is provided with a plurality of antennas respectively covering sectors of the service area of the base station and wherein unique sets of channels are allocated respectively to the antennas of the base stations which antennas are oriented in identical directions. The method comprises the steps of:

a) receiving a plurality of undesired signals of different channels by first and second ones of the antennas of the the base station to produce a plurality of sets of antenna signals respectively corresponding to the antennas, and determining the magnitudes of the antenna signals of each set, the first and second ones of the antennas being oriented in opposite directions from each other and the sets corresponding respectively to the different channels;

b) selecting a highest magnitude antenna signal from each set to produce a plurality of channel signals respectively for the channels;

c) evaluating qualities of the channel signals, and determining a list of candidate channels corresponding to those channel signals whose qualities are higher than a predetermined threshold;

d) selecting one of the candidate channels from the list depending on the magnitudes of the channel signals whose qualities are higher than the predetermined threshold;

e) determining whether the selected candidate channel has acceptable quality or not;

f) assigning the selected candidate channel to the mobile station if the selected candidate channel is determined as having acceptable quality; and g) discarding the selected candidate channel from the list and repeating the steps (e) to (f) if the selected candidate channel is determined as not having acceptable quality.

According to a fourth aspect, the present invention provides a method for dynamically assigning a channel to a mobile station from a cell-site base station of a cellular communication system wherein each base station is provided with a plurality of antennas respectively covering sectors of the service area of the base station and wherein unique sets of channels are allocated respectively to the antennas of the base stations which antennas are oriented in identical directions. The method comprises the steps of:

a) receiving undesired signals of different channels by each of first, second and third ones of the antennas of the the base station to produce a plurality of sets of first, second and third antenna signals corresponding respectively to the first, second and third ones of the antennas, and determining the magnitudes of the antenna signals of each set, the first and second antennas having respective directivity patterns and a virtual directivity pattern which is oriented in a direction opposite to a directivity pattern of the third antenna, and the sets corresponding respectively to the different channels;

b) determining the angle of arrival of a signal for each of the channels from the respective directivity patterns of the first and second antennas and the magnitudes of the first and second antenna signals of each set, and correcting the magnitude of one of the first and second antenna signals of each set having a higher magnitude by the directivity pattern of one of the first and second antennas and the virtual directivity pattern as a function of the determined angle;

c) selecting, from each set, the corrected antenna signal or the antenna signal received by the third antenna depending on their relative magnitudes to produce a plurality of channel signals respectively for the different channels;

d) evaluating qualities of the channel signals and determining a list of candidate channels corresponding to those channel signals whose qualities are higher than a predetermined threshold;

e) selecting one of the candidate channels from the list depending on the magnitudes of those channel signals whose qualities are higher than the predetermined threshold;

f) determining whether the selected candidate channel has acceptable quality or not;

g) assigning the selected candidate channel to the mobile station if the selected candidate channel is determined as having acceptable quality; and h) discarding the selected candidate channel from the list and repeating the steps (e) to (g) if the selected candidate channel is determined as not having acceptable quality.

BRIEF DESCRIPTION OF THE DRAWINGS

The present invention will be described in further detail with reference to the accompanying drawings, in which:

FIG. 8 is a flowchart illustrating a sequence of operations performed by a base station according to the fourth embodiment of the present invention.

DETAILED DESCRIPTION

Figure 1:
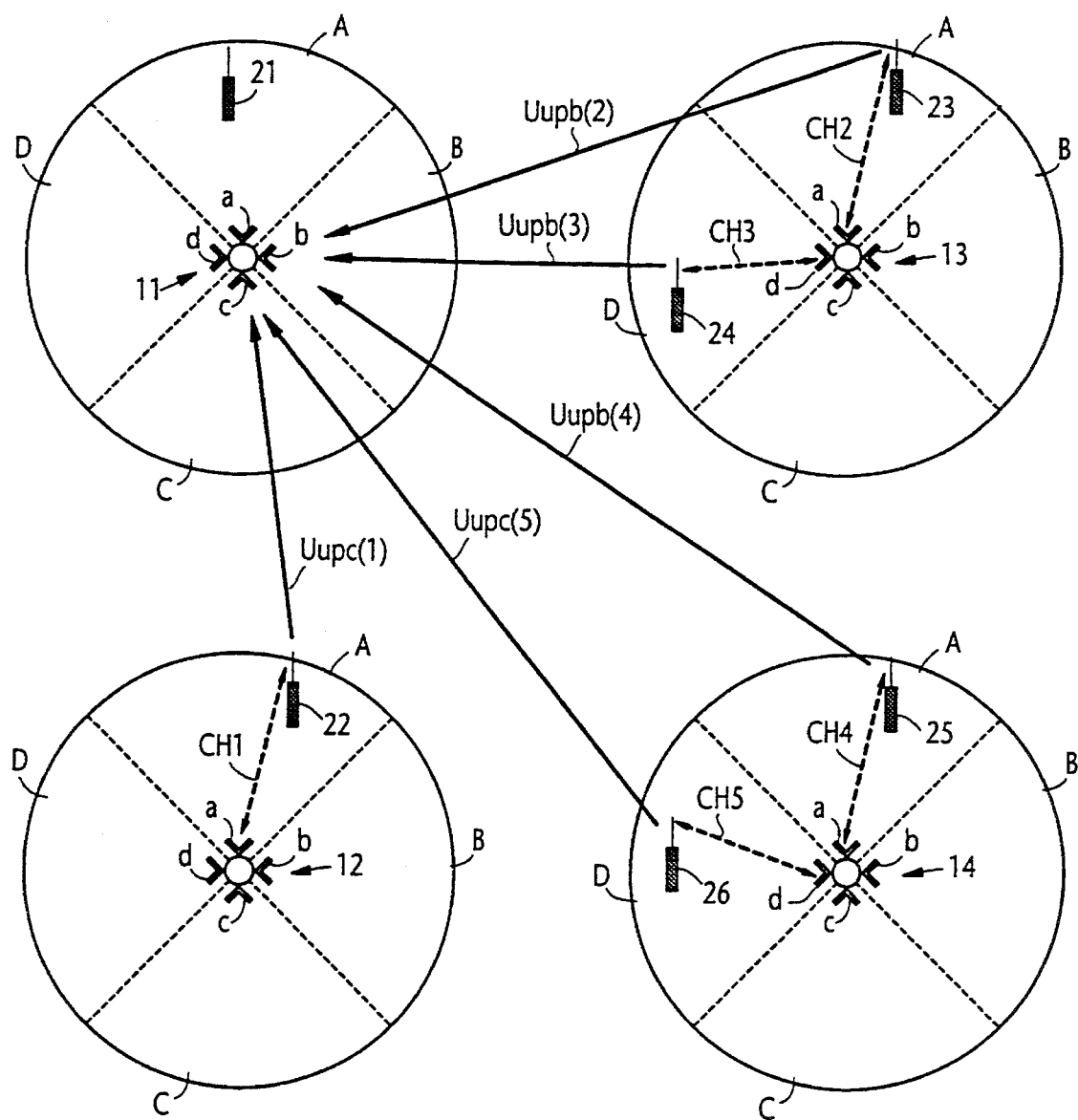
FIG. 1 is a block diagram of a cellular communication network in which the first embodiment of the present invention is implemented.

In FIG. 1, there is shown an exemplary cellular communication network in which the first embodiment of the present invention is implemented. The network comprises a plurality of identical base stations arranged according to a repeat pattern based upon a known frequency reuse plan. Each base station has an array of four directional antennas "a", "b", "c" and "d" each with a directivity pattern that covers a sector of 90 degrees on the horizontal plane, thus dividing the coverage area of the base station equally into four sectorized areas A, B, C and D. For simplicity only four base stations 11 to 14 are illustrated, which may be adjacent to each other or spaced apart at least one cell-site distance.

For purposes of control as well as speech communication, a downlink channel is established in a base-to-mobile direction and an uplink channel in a mobile-to-base direction. In this specification, a desired signal on any uplink and downlink channels is designated Dup and Ddn, respectively, and an undesired (co-channel interference) signal on any uplink and downlink channels as Uup and Udn, respectively.

According to the first embodiment of the present invention, all base stations select any pair of uplink and downlink speech channels which are allocated to the cellular network as a whole. As a typical example, communications are established on a speech channel CH1 between mobile (or personal) station 22 and base station 12, on channels CH2, CH3 between mobiles 23, 24 and base station 13, and on channels CH4, CH5 between mobiles 25, 26 and base station 14. It is therefore likely that the antenna "b" of base station 11 will be exposed to the transmissions of undesired signals Uup from mobile stations 23, 24 and 25 (and hence the undesired signals are indicated as Uupb), and the antenna "c" of base station 11 will he exposed to the transmissions of undesired signals Uupc from mobile stations 22 and 26. In response to a call request signal from a mobile station 21, the base station 11 assigns a channel to the mobile station according to a channel assignment algorithm of the present invention, using undesired uplink signals from the surrounding base stations.

Figure 2:
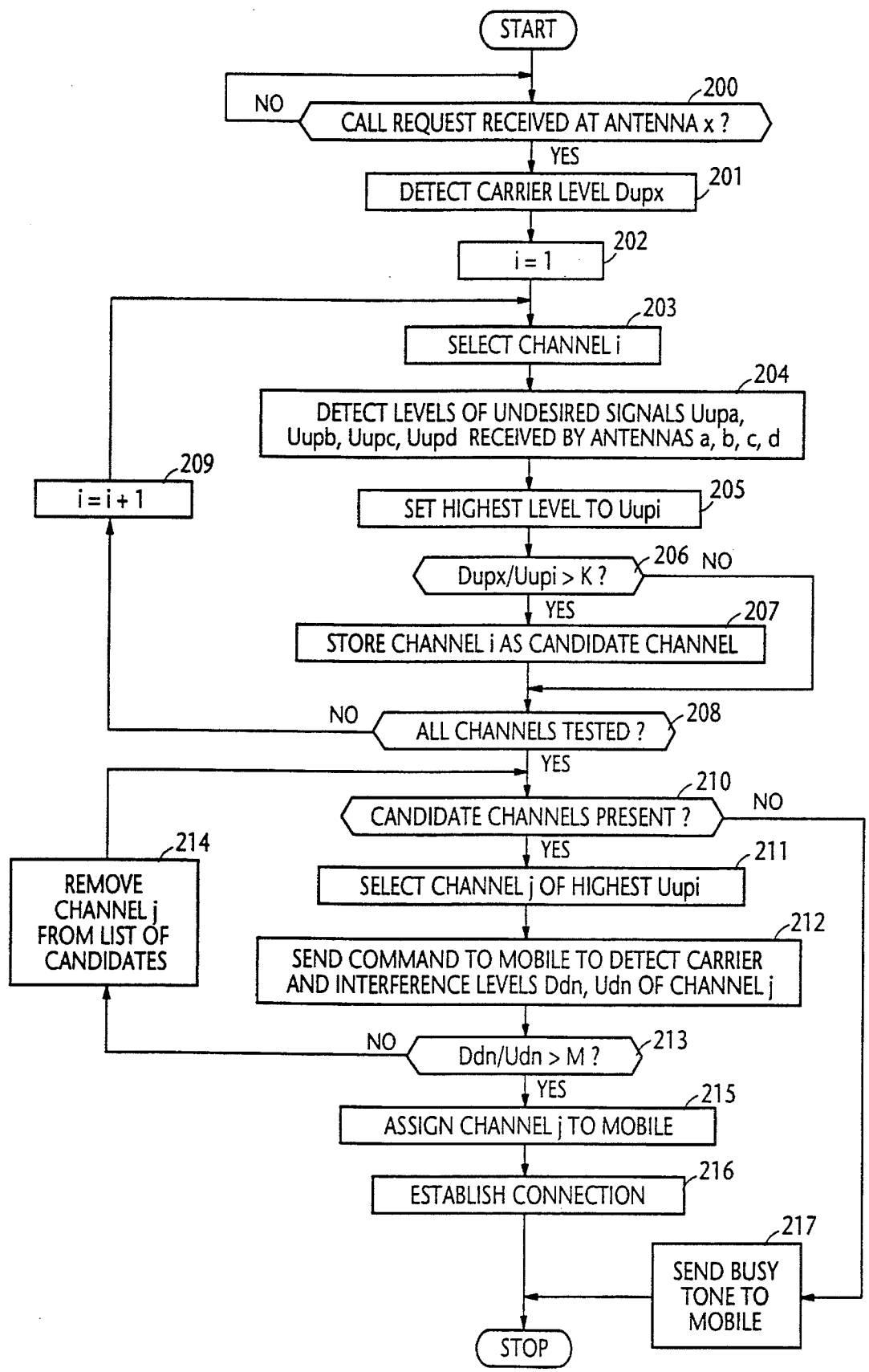
FIG. 2 is a flowchart illustrating a sequence of operations performed by a base station and a mobile station according to the first embodiment.

The channel assignment algorithm of the first embodiment is shown in FIG. 2. In response to a call request signal sent from a mobile or personal station on an uplink control channel. This call request is received by one of its antennas which is, for convenience, designated "x" (step 200). The base station proceds to detect the power level of the received carrier and identifies it as Dupx (step 201). A variable "i" is set equal to 1 at step 202 and a channel identified by the variable ils selected (step 203). Exit then is to step 204 to detect the power levels of signals Uupa, Uupb, Uupc and Uupd, which are received by antennas a, b, c and d, respectively. Control proceeds to step 205 to determine the highest of the detected power levels and set it as Uupi as a possible interference signal. A ratio Dupx/Uupi is then calculated and compared with a predetermined value k (step 206). If the ratio is greater than k, control branches at step 206 to step 207 to set the channel i Bs a candidate channel, and proceeds to step 208 to determine whether all channels are tested. If the answer is negative, control branches at step 208 to step 209 to increment the variable i by one and returns to step 203 to repeat the process. If the decision at step 206 is negative, control branches out to step 208, skipping step 207.

In FIG. 1, the base station 11 is assumed to receive the call request from mobile 21 at antenna "a" to detect the power level of the uplink signal Dupa, and to receive only one undesired signal for each channel. Therefore, with respect to channel CH1 (channel number I=1), the undesired uplink signal Uupc(1) frum mobile station 22 is classified as having a highest power level at step 205. As the candidate determination process is tepeeted, channels CH2, CH3, CH4 and CH5 are successively tested, yielding ratios Dupa/Uup2, Dupa/Uup3, Dupa/Uup4, Dupa/Uup5. If the undesired uplink signals Uupc(1), Uupb(2) and Uupb(3) are relatively strong and their ratios Dupa/Uup1, Dupa/Uup2 and DupE/Uup3 are determined at step 206 to be smaller than K, channels CH1, CH2 and CH3 will be discarded and the remaining channels CH4 and CH5 will be recorded in a memory as candidate channels having a high degree of cross-correlation with the desired downlink signal Ddn.

Following the execution of step 208, control now enters a channel selection process. At step 210, a decision is made on whether candidate channels are present or not. If not, control exits to step 217 to send a busy tone to mobile station 21. If the answer is affirmative, control branches at step 210 to step 211 to select a candidate channel corresponding to the signal Uupi having the highest power level from the list of candidates determined by step 207 and set the selected candidate channel as a channel j. Exit then is to step 212 to transmit a carrier on the selected channel j from base station 11 and send a command over the control channel to mobile station 21 to measure the power level of the transmitted carrier to determine a value Ddn. Base station 11 then ceases the transmission of the carrier and commands mobile station 21 to measure the level of noise detected on channel to determine a value Udn. At step 213, mobile station 21 calculates the ratio Ddn/Udn and compares it with a prescribed threshold value M and sends a signal indicating whether the ratio is higher than the threshold.

If the signal indicates that the ratio is smaller than the threshold (step 213), base station 21 removes the channel j from the list of the candidates (step 214) and returns to step 210 to check to see if candidate channels still exist if the answer is affirmative, the channel of next highest is selected as channel j(step 211), and steps 212 and 213 are repeated. If the signal from mobile station 21 indicates that the ratio is greater than the threshold M, channel j is assigned to the mobile station (step 215) and a two-way connection is established on the assigned channel.

The of a maximum power level at step 211 with priority enables base station 11 to eventually assign a group of channels having reduced frequency separations from each other at a cost of somewhat increase in co-channel interference, a compromise between the conflicting factors of channel utilization efficiency and co-channel interference. As a trade-off between these conflicting factors, other known channel assignment approaches are available. However, regardless of the approaches taken by the channel assignment subroutine (steps 210 to 216), the candidate selection subroutine (steps 203 to 208) of the present invention enables each base station of the cellular communication network to make an optimum decision on channel utilization efficiency and co-channel interference. Additionally, the present invention enables each base station to reduce the occurrence of co-channel interference and to reduce the number of repeated attempts to determine the best channel.

Figure 3:
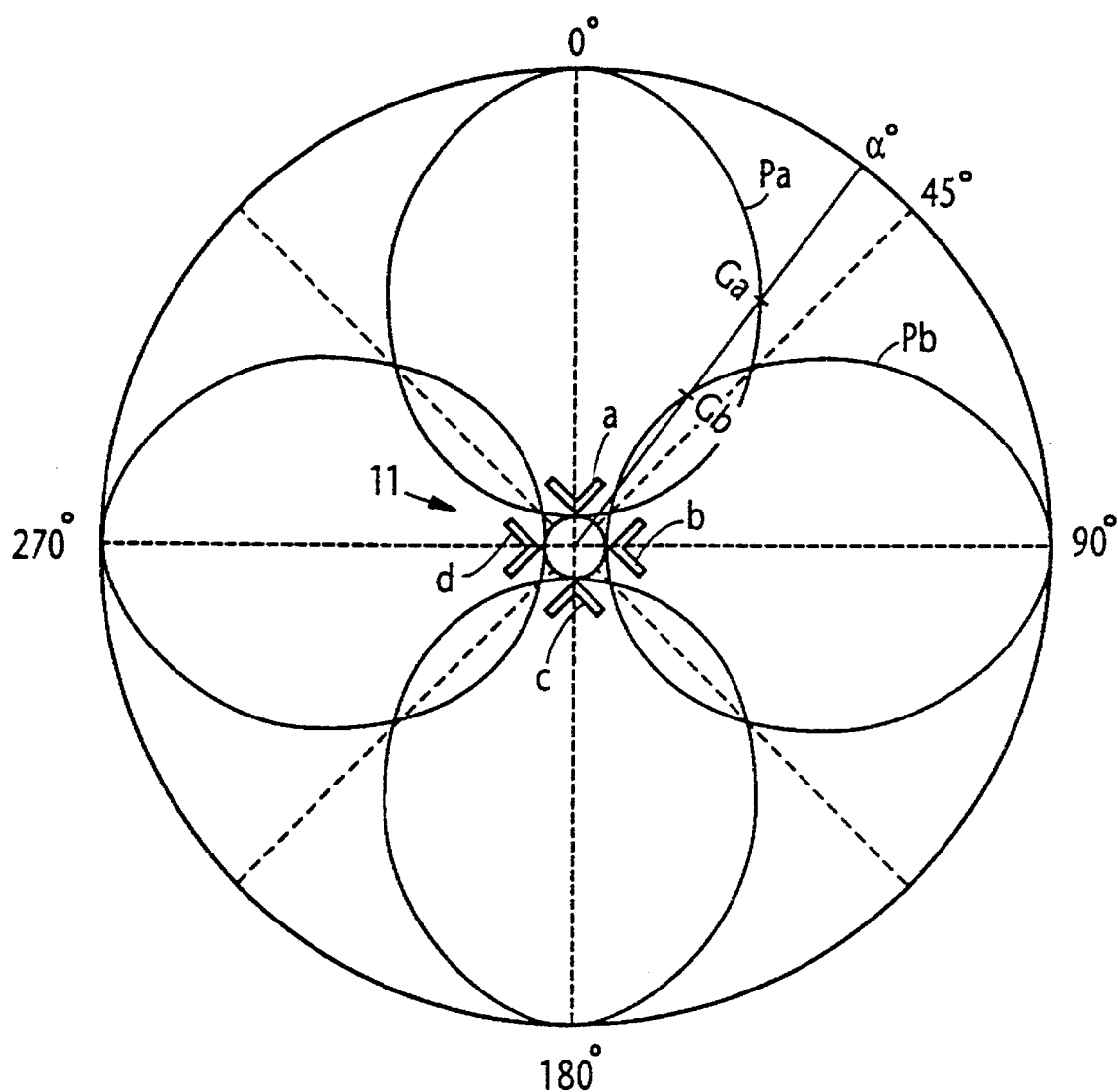
FIG. 3 is an illustration of directivity patterns of a four-antenna array used in the cellular network according to a second embodiment of the present invention.

According to a second embodiment of the present invention, the determination of the undesired signal of highest power Uupi at step 205 of FIG. 2 is modified. According to this modification, when an undesired signal is detected by two or more antennas, two of the signals having the highest and second highest power levels are selected and the highest power level is compensated for with a correction factor determined by the angle of arrival of the undesired signal. As illustrated in FIG. 3, each antenna has an identical directivity pattern P on a horizontal plane and the antenna directivity is represented by relative gain (a fraction of unity) with respect to the main axis of the antenna. If an undesired signal arrives at an angle $\alpha$ with respect to a reference angle (zero degrees) as shown in FIG. 3, it intersects the directivity patterns Pa and Pb of antennas "a" and "b" at points where relative gains are Ga and Gb, respectively, which are fractions of unity with respect to the main axes of their antennas. By representing the power levels of the signals received by antennas "a" and "b" as Uupa and Uupb, respectively, the power ratio Uupa/Uupb is equal to the antenna gain ratio Ga/Gb. Therefore, the relation Ga/Gb=Uupa/Uupb holds. The arrival angle of any undesired signal can be determined as being equal to act if the relation $Ga(\alpha)/Gb(\alpha)$=Uupa/Uupb is satisfied. With the arrival angle being determined for a an antenna, the highest value Uupa is divided by relative gain $Ga(\alpha)$ to obtain Uupi which is equivalent to a signal arriving in the direction of the main axis of the antenna and detected with the gain of unity.

In a practical aspect, the relative gain $Gx(\alpha)$ of antenna "x" is stored in a location of an antenna gain memory, not shown, in which relationships between arrival angles and relative antenna gains are mapped for each pair of adjacent antennas.

Figure 4:
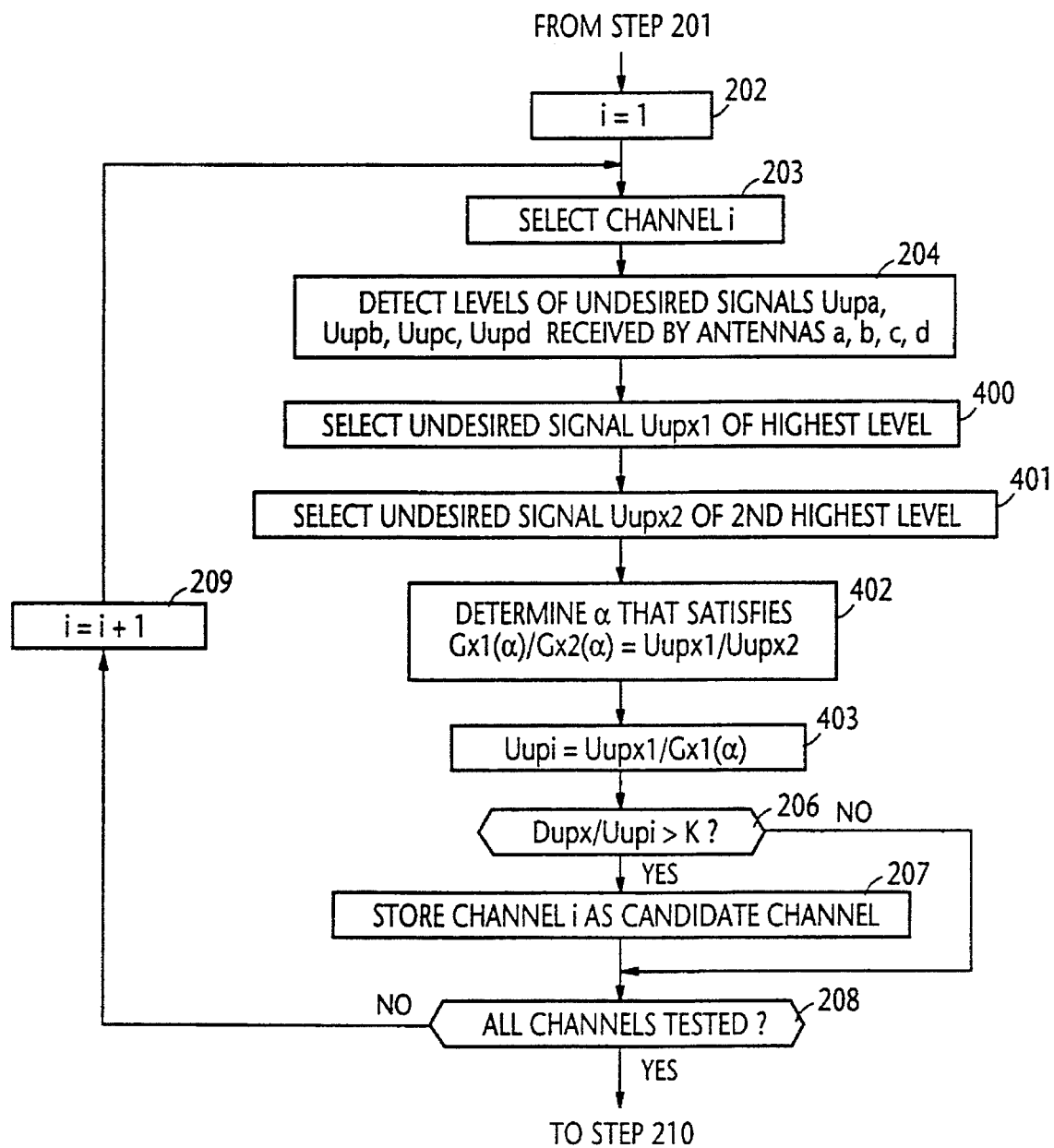
FIG. 4 is a flowchart illustrating a sequence of operations performed by a base station according to the second embodiment.

FIG. 4 shows a flowchart for implementing the second embodiment of the present invention which is similar to the flowchart of FIG. 2 with the exception that step 205 of FIG. 2 is replaced with steps 400, 401, 402 and 403. Following the execution of step 204, control exits to step 400 to select an undesired signal of highest level from antenna x1 and set the power level of the signal as Uupx 1. Exit then is to step 401 to select an undesired signal of the second highest level from antenna x2 and set the power level of the signal as Uupx2. At step 402, the antenna gain memory is searched for $Gx1(\alpha)$ and $Gx2(\alpha)$ which establish the relation $Gx1(\alpha)/Gx2(\alpha)$=Uupx1/Uupx2 and determines the angle of arrival $\alpha$ from this relationship. At step 403, Uupx1 is divided by $Gx1(\alpha)$ to determine the undesired signal of channel "i" with the highest power level Uupi. Step 403 is followed by step 206 to check to see if the ratio Dupx/Uupi is greater than the threshold value K.

Figure 5:
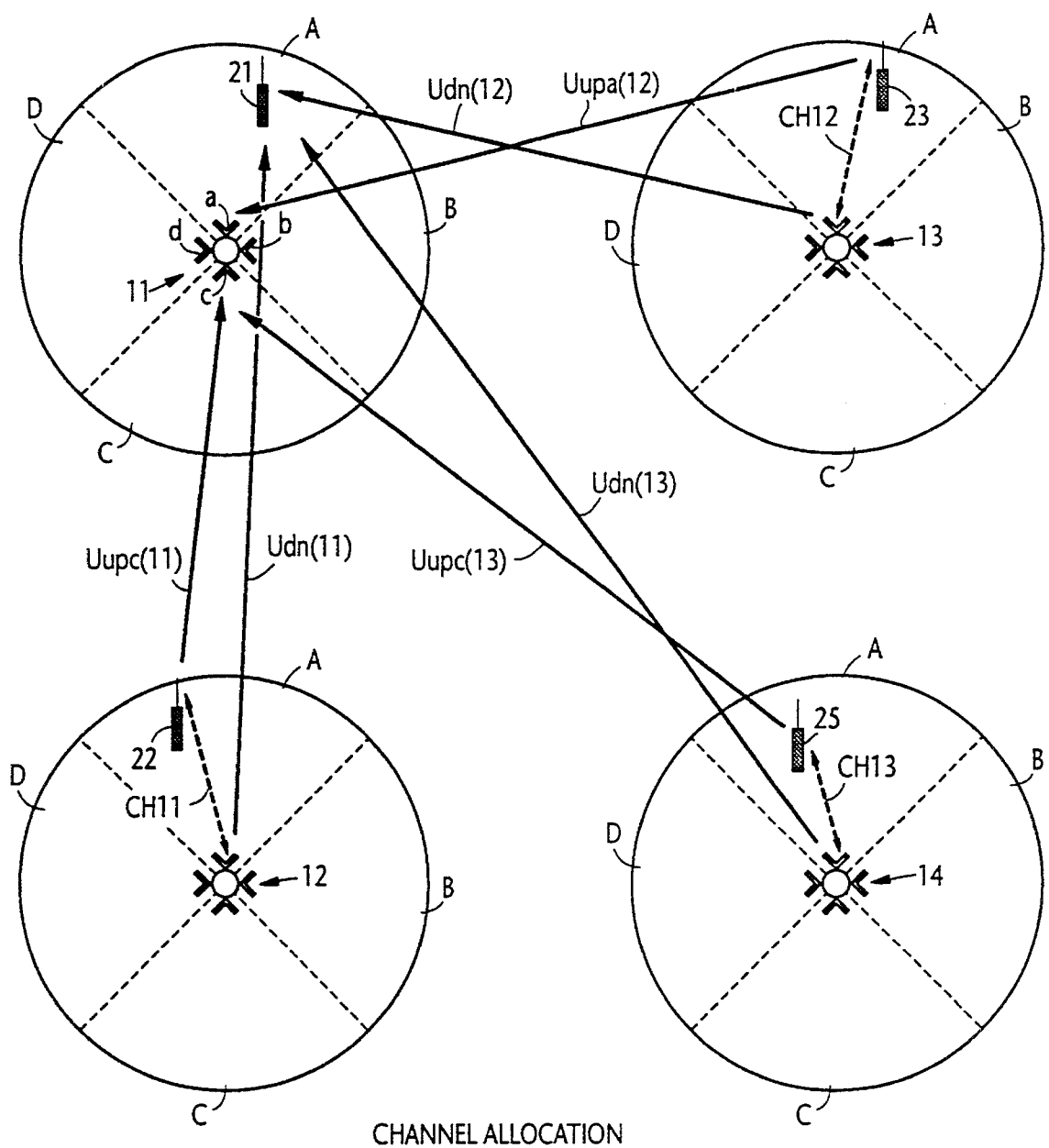
FIG. 5 is a block diagram of a cellular communication network in which the third embodiment of the present invention is implemented.

According to a third embodiment of the present invention which is shown in FIG. 5, each sector area of all the base stations is allocated a group of channels which are different from the channels of the other sectors of all the base stations but identical to those allocated to the sector areas of the other base stations which are illuminated by the antennas of the same orientation as the antenna of that sector area. For example, sector areas A of all cell site stations are allocated the same group of channels CH11, CH12, . . . which differ from those allocated to the other sector areas. With this channel allocation plan, mobile station 21 of base station 11 is likely to be affected by undesired signals from antennas "a" of the other base stations 12, 13 and 14 as indicated by arrows Udn(11) on channel CH11 from base station 12, Udn(12) on channel CH12 from base station 13 and Udn(13) on channel CH13 from base station 14. According to this embodiment, cross correlation is detected between undesired signals received by a pair of antennas oriented in opposite directions. Thus, for mobile station 21, antennas "a" and "c" of base station 11 are used for determining the cross correlation.

Figure 6:
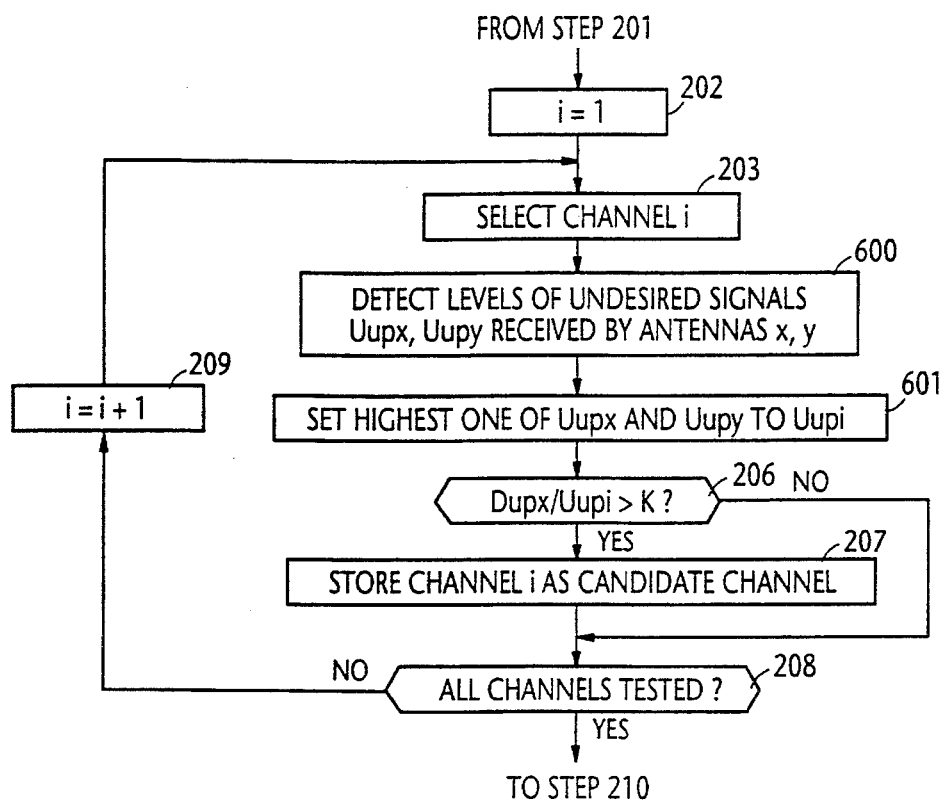
FIG. 6 is a flowchart illustrating a sequence of operations performed by a base station according to the third embodiment.

FIG. 6 shows a flowchart for implementing the third embodiment of the present invention which is similar to the flowchart of FIG. 2 with the exception that steps 204 and 205 of FIG. 2 are replaced with steps 600 and 601. Following the execution of step 203, control exits to step 600 to detect power levels of undesired signals Uupx and Uupy received at antennas "x" and "y" of mutually opposite orientations, using correlation receivers, not shown. Control advances to step 601 to determine the highest of the signals Uupx and Uupy and stores it as Uupi for channel i. Exit then is to step 206 to determine whether the ratio of the power level Dupx of downlink signal received at mobile station 21 to Uupi is greater than the threshold K.

Therefore, in the example illustrated in FIG. 5, signal Uupc(11) from mobile station 22 is received by antenna "c" at cell site 11 and detected by the correlation receiver coupled to this antenna at step 600 when the variable i set equal to channel CH11 as well as signals received by antenna "a". If the signal Uupc(11) is higher than the signals received by antenna "a", it is selected as Uup1 at step 601 and the ratio Dupx/Dup1 is compared with K at step 206. As the candidate selection subroutine of FIG. 6 proceeds at base station 11, a signal Uupa(12) on channel CH12 from mobile station 23 is received by antenna "a" and detected at step 600 when variable i is set equal to channel CH12 as well as signals received by antenna "c". If the signal Uupa(12) is higher than the signals received by antenna "c", it is selected as Uup2 at step 601 and the ratio Dupx/Uup2 is compared with K at step 206. In the same manner, a signal Uupc(13) on channel CH13 from mobile station 25 is detected by antenna "c" when variable i is set equal to CH13 and compared with signals received by antenna "a" and will be selected as Uup3, and the ratio Dupx/Uup3 is compared with K. If the results of the comparisons successively made at step 206 in the above process indicate that the respective ratios are higher than K, channels CH11, CH12 and CH13 will be stored as candidate channels at step 207. Therefore, if signal Uupc(11) is of highest power level, the ratio Ddn(11)/Udn(11) will be determined by mobile station 21 to be higher than threshold M at step 213 in the subsequent channel assignment subroutine (see FIG. 2) and channel CH11 will be assigned to mobile station 21.

Figure 7:
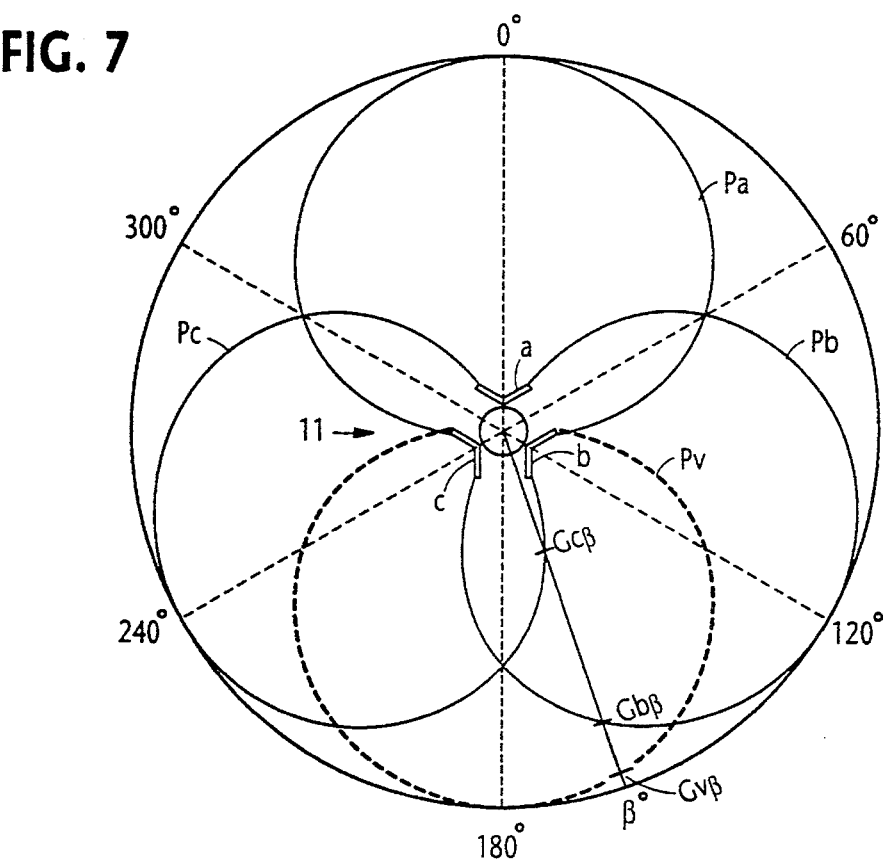
FIG. 7 is an illustration of directivity patterns of a three-antenna array used in the cellular network according to a fourth embodiment of the present invention.

The third embodiment of this invention can be used to advantage if an even number of antennas is provided for all base stations. However, if there exists at least one base station having an odd number of antennas, the third embodiment cannot simply apply. To this end, a three-antenna array is illustrated in FIG. 7 for a base station 11 in the network of FIG. 5 as a fourth embodiment of the present invention. As shown, antennas "a", "b" and "c" have identical directivity patterns Pa, Pb and Pc, respectively, on a horizontal plane and the directivity is represented by relative gains Ga, Gb, Gc each having a fraction of unity relative to their main axis in a manner similar to those shown in FIG. 3. If an undesired signal arrives at an angle β with respect to the zero-degree reference, component signal Uupb will be of highest level and component signal Uupc will be of second highest level. Therefore, the relation Gb(β)/Gc(β)=Uupb/Uupc is established. By using this relation, the angle of arrival β is determined and a correction is made on the highest power level by dividing it with Gb(β) and then multiplying with Gv(β) which is the relative gain at angle β of a virtual directivity pattern Pv. This virtual pattern is obtained by reflecting a copy of the directivity pattern Pa of antenna "a". The relative gain Gb(β), Gyc(β) of a pair of adjacent antennas "b" and "c" and the relative gain Gv(β) are stored in a memory, not shown, in which relationships are mapped between arrival angles and relative antenna gains for each pair of adjacent antennas and a virtual directivity pattern resulting from each pair of these antennas.

FIG. 8 is a flowchart for implementing the fourth embodiment of the present invention. The flowchart of FIG. 8 is similar to that shown in FIG. 2 with the exception that steps 204 and 205 of FIG. 2 are replaced with steps 800, 801, 802, 803 and 804. Following the execution of step 203, control exits to step 800 to detect undesired signal components from antennas y1 and y2 having highest and second highest power levels and store the power levels of these components as Uupy1 and Uupy2, respectively. Exit then is to step 801 to detect an undesired signal component from antenna x and store the power level of this component as Uupx. At step 802, the memory is searched for Gy1(β) and Gy2(β) which establish the relation Gy1(β)/Gy2(β)=Uupy1/Uupy2 and determines the angle of arrival β from this relationship, and Gv(β) is retrieved from the memory as a function of the determined angle β. At step 803, Uupy1 is divided by Gy1(β) to produce a quotient which is then multiplied with Gv(β) to precisely determine the power level Uupy for the signal arriving at angle β. At step 804, the highest of the power levels Uupx and Uupy is selected and set this highest power level as Uupi for channel "i", Step 804 is followed by step 206 to check to see if the ratio Dupx/Uupi is greater than the threshold value K.

What is claimed is:

1. In a cellular communication system comprising a mobile station and a plurality of base stations each having a plurality of antennas respectively covering sectors of the service area of the base station, a method for dynamically assigning a channel from a said base station to said mobile station, comprising the steps of:
   a) receiving a plurality of undesired signals of different channels by each of said antennas of the said base station to produce a plurality of sets of antenna signals respectively corresponding to said antennas, and determining the magnitudes of the antenna signals of each set, said sets corresponding respectively to said different channels;
   b) selecting one of the antenna signals from each set depending on their magnitudes to produce a plurality of channel signals respectively for said different channels;
   c) evaluating qualities of the channel signals, and determining a list of candidate channels corresponding to ones of the channel signals whose qualities are higher than a predetermined threshold;
   d) selecting one of the candidate channels from said list depending on the magnitudes of said ones of the channel signals;
   e) determining whether the selected candidate channel has acceptable quality or not;
   f) assigning said selected candidate channel to said mobile station if the selected candidate channel is determined as having acceptable quality; and
   g) discarding the selected candidate channel from said list and repeating the steps (d) to (f) if the selected candidate channel is determined as not having acceptable quality.

2. A method as claimed in claim 1, wherein the magnitude of the antenna signal which is selected by the step (b) is the highest of the magnitudes of the antenna signals of each set.

3. A method as claimed in claim 1, further comprising the step of sending a signal to said mobile station indicating unavailability of channels if all the candidate channels are discarded.

4. In a cellular communication system comprising a mobile station and a plurality of base stations each having a plurality of antennas respectively covering sectors of the service area of the base station, a method for dynamically assigning a channel from a said base station to said mobile station, comprising the steps of:
   a) receiving a plurality of undesired signals of different channels by said antennas of the said base station to produce a plurality of sets of antenna signals respectively corresponding to said antennas, and determining the magnitudes of the antenna signals of each set, said sets corresponding respectively to said different channels;
   b) selecting a highest magnitude antenna signal from each set and identifying a first one of the antennas by which said highest magnitude antenna signal is received;
   c) selecting a second highest magnitude antenna signal from each set and identifying a second one of the antennas by which said second highest magnitude antenna signal is received, said second one of the antennas having a directivity pattern located adjacent a directivity pattern of said first one of said antennas;
   d) determining the angle of arrival of a signal from the directivity patterns of said first and second ones of said antennas and the magnitudes of said highest magnitude antenna signal and said second highest magnitude antenna signal, and correcting the magnitude of the highest magnitude antenna signal by the directivity pattern of one of said first and second antennas as a function of the determined angle to produce a channel signal for each set;
   e) evaluating qualities of the channel signals of said sets, and determining a list of candidate channels corresponding to ones of the channel signals whose qualities are higher than a predetermined threshold;
   f) selecting one of the candidate channels from said list depending on the magnitudes of said ones of the channel signals;
   g) determining whether the selected candidate channel has acceptable quality or not;
   h) assigning said selected candidate channel to said mobile station if the selected candidate channel is determined as having acceptable quality; and
   i) discarding the selected candidate channel from said list and repeating the steps (f) to (h) if the selected candidate channel is determined as not having acceptable quality.

5. A method as claimed in claim 4, further comprising the step of sending a signal to said mobile station indicating unavailability of channels if all the candidate channels are discarded.

6. In a cellular communication system comprising a mobile station and a plurality of base stations each having a plurality of antennas respectively covering sectors of the service area of the base station, wherein unique sets of channels are allocated respectively to the antennas of said base stations which are oriented in identical directions, a method for dynamically assigning a channel from a said base station to said mobile station, comprising the steps of:

a) receiving a plurality of undesired signals of different channels by first and second ones of said antennas of the said base station to produce a plurality of sets of antenna signals respectively corresponding to said antennas, and determining the magnitudes of the antenna signals of each set, said first and second ones of said antennas being oriented in opposite directions from each other and said sets corresponding respectively to said different channels;
   b) selecting a highest magnitude antenna signal from each set to produce a plurality of channel signals respectively for said channels;
   c) evaluating qualities of said channel signals, and determining a list of candidate channels corresponding to ones of the channel signals whose qualities are higher than a predetermined threshold;
   d) selecting one of the candidate channels from said list depending on the magnitudes of said ones of the channel signals;
   e) determining whether the selected candidate channel has acceptable quality or not;
   f) assigning said selected candidate channel to said mobile station if the selected candidate channel is determined as having acceptable quality; and
   g) discarding the selected candidate channel from said list and repeating the steps (d) to (f) if the selected candidate channel is determined as not having acceptable quality.

7. A method as claimed in claim 6, further comprising the step of sending a signal to said mobile station indicating unavailability of channels if all the candidate channels are discarded.

8. In a cellular communication system comprising a mobile station and a plurality of base stations each having a plurality of antennas respectively covering sectors of the service area of the base station, wherein unique sets of channels are allocated respectively to the antennas of said base stations which are oriented in identical directions, a said base station having an odd number of antennas, a method for dynamically assigning a channel from the said base station to said mobile station, comprising the steps of:

a) receiving undesired signals of different channels by each of first, second and third ones of the antennas of the said base station to produce a plurality of sets of first, second and third antenna signals corresponding respectively to said first, second and third ones of said antennas, and determining the magnitudes of the antenna signals of each set, said first and second ones of the antennas having respective directivity patterns and a virtual directivity pattern which is oriented in a direction opposite to a directivity pattern of said third one of the antennas, and said sets corresponding respectively to said different channels;
   b) determining the angle of arrival of a signal for each of said channels from the respective directivity patterns of said first and second ones of said antennas and the magnitudes of said first and second antenna signals of each set, and correcting the magnitude of one of the first and second antenna signals of each set having a higher magnitude by the directivity pattern of one of said first and second ones of the antennas and said virtue directivity pattern as a function of the determined angle;
   c) selecting, from each set, the corrected antenna signal or the antenna signal received by said third one of the antennas depending on their relative magnitudes to produce a plurality of channel signals respectively for said different channels;
   d) evaluating qualities of said channel signals and determining a list of candidate channels corresponding to ones of channel signals whose qualities are higher than a predetermined threshold;
   e) selecting one of the candidate channels from said list depending on the magnitudes of said ones of the channel signals;
   f) determining whether the selected candidate channel has acceptable quality or not;
   g) assigning said selected candidate channel to said mobile station if the selected candidate channel is determined as having acceptable quality; and
   h) discarding the selected candidate channel from said list and repeating the steps (e) to (g) if the selected candidate channel is determined as not having acceptable quality.

9. A method as claimed in claim 8, further comprising the step of sending a signal to said mobile station indicating unavailability of channels if all the candidate channels are discarded.

* * * * *